United States Patent [19]

Leifer

[11] Patent Number: 5,793,865
[45] Date of Patent: *Aug. 11, 1998

[54] CORDLESS HEADSET TELEPHONE

[76] Inventor: Richard Leifer, 11 Beaumont Dr., Melville, N.Y. 11747

[*] Notice: The term of this patent shall not extend beyond the expiration date of Pat. No. 5,721,775.

[21] Appl. No.: 821,965

[22] Filed: Mar. 7, 1997

Related U.S. Application Data

[63] Continuation of Ser. No. 449,557, May 24, 1995, abandoned.

[51] Int. Cl.[6] .............................. H04M 1/00; H04R 25/00
[52] U.S. Cl. ............................ 379/430; 381/183; 381/187
[58] Field of Search ....................... 379/430, 449, 379/432, 368–370; 381/183, 187; D14/205, 223, 137, 138; 455/568

[56] References Cited

U.S. PATENT DOCUMENTS

| | | |
|---|---|---|
| 4,741,030 | 4/1988 | Wilson . |
| 4,882,745 | 11/1989 | Silver . |
| 5,113,428 | 5/1992 | Fitzgerald . |
| 5,177,784 | 1/1993 | Hu . |

FOREIGN PATENT DOCUMENTS

| | | | |
|---|---|---|---|
| 56-6544 | 1/1981 | Japan | 379/368 |
| 63-144130 | 7/1986 | Japan | 379/430 |

*Primary Examiner*—Jack Chiang
*Attorney, Agent, or Firm*—Collard & Roe, P.C.

[57] ABSTRACT

A cordless headset telephone for cordless hands free telephone communication between a base unit and the headset. The cordless headset has a first and third operable position as a headset and a second operable position as a hand held telephone receiver.

37 Claims, 6 Drawing Sheets

1

CORDLESS HEADSET TELEPHONE

This is a continuation of application Ser. No 08/449,557 filed on May 24, 1995, now abandoned.

BACKGROUND OF THE INVENTION

1. Field of the Invention

The present invention relates to cordless telephones. More particularly, it relates to a cordless headset telephone for providing hands-free cordless telephone communication.

2. The Prior Art

The patent to Silver, U.S. Pat. No. 4,882,745, discloses a cordless headset telephone. The invention consists of a headset having one earpiece connected to a headband and a mouthpiece connected to the earpiece and extending in front of the users mouth. The invention includes a battery within the headset, a charger for the battery in the base unit, a memory for phone numbers, 2-way paging, an intercom, a speaker phone built into the base and a multiuser multi-link capability. The base unit shown, contains a keypad for dialing and using the phone without the headset.

U.S. Pat. No. 5,113,428 to Fitzgerald, discloses a cordless telephone headset. The invention consists of cordless telephone incorporated into a headset. The headset has two earpieces, a microphone flexibly mounted to the headset and a supplemental headstrap. The headset includes buttons disposed on the outside of each earpiece. One set of buttons are for dialing the phone. The second set of buttons provide a plurality of functions such as, for example, MEMORY, FLASH and REDIAL. The supplemental headstrap provides further support and comfort during operation. The headset contains the battery, and the base unit charges the battery when the headset is not in use.

U.S. Pat. No. 4,741,030 to Wilson, discloses a communications headset. The invention consists of a cordless telephone incorporated into a hands free headset. The headset has a head band with one earpiece and a mouthpiece extending from the earpiece and disposed in front of the mouth of the user. The mouthpiece of the invention has a plurality of dialing buttons disposed around the microphone for dialing a desired number. A rechargeable battery pack is disposed on the headband portion of the headset. An ear support member opposite the earpiece, rests on the users other ear to provide comfort and support during use.

SUMMARY OF THE INVENTION

The present invention provides a cordless headset telephone having an adjustable headband formed by joining a first and a second curved portion. In one embodiment, the first curved portion has an end battery compartment for receiving a rechargeable battery and a pivotable pad disposed on the inside surface thereof. The pivotable pad provides comfort and support of the headset against the users head during operation. The second curved portion of the headband includes a flexible ribbed portion at the top side where the first and second curved portions are joined. On the inside surface of the second curved portion is an earpiece for placement on the user's ear.

An extended microphone arm is rotatably connected to the second curved portion at the base of the earpiece. The extended microphone arm has three operable positions and includes a rotatable microphone attached to the end thereof. The first operable position of the microphone arm is in a first headset position where it extends outwardly to the front of the users mouth. The second operable position is a handset position where the microphone arm is rotated and positioned such that it extends along the inside surface of the curved portions of the headset. This allows the headset to be held as a conventional handset with the microphone disposed adjacent the pivotable support pad. The third operable position of the microphone arm is in a second headset position whereby said microphone arm is displaced approximately 180 degrees from the first operable headset position to allow the use of the headset with the other ear. The rotatable microphone has multiple separate positions for providing multiple different functions, and includes a multi-color LED mounted therein for indicating the present position and function of the microphone.

The headset includes a ringer built therein and disposed near the top of the headset. A dial switch with volume control enables the user to control the use of the ringer and the volume thereof. A releasable keypad is contained within the second curved portion of the headset opposite the earpiece. The keypad can be released from the headset and used as any conventional phone keypad. A retractable wire connects the keypad to a retracting mechanism within the headset and allows for selectively releasing and retracting the keypad out of and into the headset.

In a second embodiment of the invention, a plurality of control buttons are added to the headset for controlling the telephone operation and special functions thereof. An external antenna is provided for sending and receiving the cordless transmissions. In addition, a clip is added to the removable keypad to enable the connection of the keypad to the clothing of the user.

In a third embodiment of the invention, the battery compartment for receiving the rechargeable battery is disposed underneath the removable keypad on the second curved portion of the headset.

In a fourth embodiment of the invention, the battery compartment for receiving the rechargeable battery is disposed within the removable keypad. Furthermore, the antenna for sending and receiving signals is internal and incorporated into the adjustment band of the headset.

It is therefore an object of the present invention to provide a cordless headset telephone that has two operable positions as a headset and one operable position as a handset.

Another object of the invention is to provide a cordless headset telephone that is adjustable to allow the user to place the earpiece on the ear of their choice.

It is another object of the invention to provide a cordless headset telephone that includes a releasable keypad for enabling the dialing of the phone without removing the headset.

Yet another object of the invention is to provide a cordless headset telephone that includes a ringer built therein and positioned away from the ears of the user.

It is still another object of the invention to provide a cordless headset telephone that does not require an additional phone for performing any telephone functions.

BRIEF DESCRIPTION OF THE DRAWINGS

Other objects and features of the present invention will become apparent from the following detailed description considered in connection with the accompanying drawings which disclose four embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
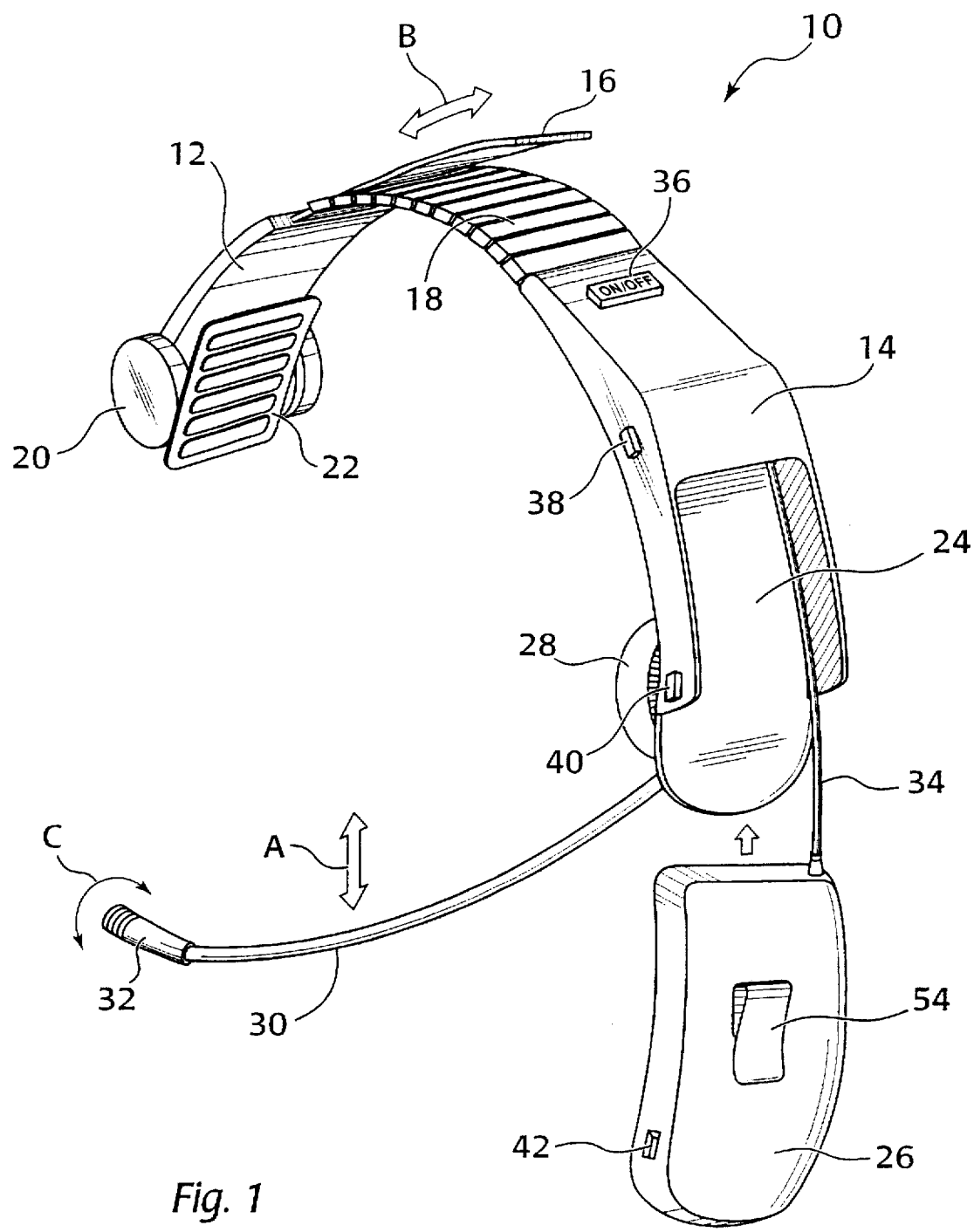
FIG. 1 is a perspective view of a first embodiment of the cordless headset telephone according to the invention.

Turning now in detail to the drawings, FIG. 1 shows a first embodiment of cordless headset 10 having a first curved portion 12 and a second curved portion 14 adjustably connected together to form the headband of the cordless headset. First curved portion 12 includes a battery compartment 20 for receiving a rechargeable battery and a pivotable comfort/support pad 22 for providing comfortable support on the user's head when headset 10 is in its first operable position. Battery compartment 20 can include contacts (not shown) for engaging a charging device which charges the rechargeable battery while contained in said compartment.

Second curved portion 14 has a flexible headband portion 18 which is connected to first curved portion 12 via adjustment band 16. Flexible portion 18 can be configured in any suitable known form. As shown, flexible portion 18 is a plurality of small rectangular members connected together in next adjacent relation with each other. Flexible portion 18 is designed to be resilient and allow the opposite free ends of first curved portion 12 and second curved portion 14 to be extended outward for fitting the headset on the users head. Adjustment band 16 slides in and out flexible headband 18 as indicated by the direction arrow B.

The second curved portion 14 has a keypad 26 releasably connected thereto through a wire 34. Release button 40 on curved portion 14 engages the keypad lock receptacle 42 on keypad 26 to lock the keypad into the headset. A retraction mechanism within curved portion 14 (not shown) is activated by button 38 and retracts wire 34, and thereby keypad 26, into curved portion 14. Keypad 26 can be removed from curved portion 14 of headset 10 and used to dial the phone without having to remove the headset. The retraction mechanism maintains keypad wire 34 under tension when being withdrawn from curved portion 14 and subsequently locks wire 34 in place when the withdrawal action stops. Wire 34 is always attached to the retraction mechanism within curved portion 14. Thus, the retraction mechanism maintains wire 34, and thereby keypad 26, in the desired position until released by release button 40. Wire 34 is thin enough to allow for easy withdrawal and retraction of keypad 26, but is strong enough to stand up against consistent use.

An earpiece 28 is disposed on the inside surface of curved portion 14 for engaging the user's ear. Earpiece 28 is generally made from a soft material such as foam rubber, but may be made of any suitable known material. A microphone arm 30 is connected to curved portion 14 at the base of earpiece 28, and extends outwardly therefrom. Microphone arm 30 terminates with a microphone 32 at its end. Microphone arm 30 is rotatably displaceable about earpiece 28 as indicated by direction arrow A. Microphone 32 at the end of microphone arm 30 is rotatable thereon as indicated by arrow directions C. Microphone 32 can be a condenser microphone or any other suitable known type of microphone.

In the position shown in FIG. 1, microphone arm 30 is disposed such that earpiece 28 will be placed on the left ear of the user. Microphone arm 30 can be rotated approximately 200°–250° in the direction of arrow A such that the user may position earpiece 28 on the right ear. This is a third operable position of headset 10.

In this embodiment, cordless headset 10 includes an internal antenna that is built directly into said headset. The antenna enables the headset to transmit and receive information to and from a base unit associated therewith. The base unit (not shown) can be a standard base of any suitable known type.

Figure 2:
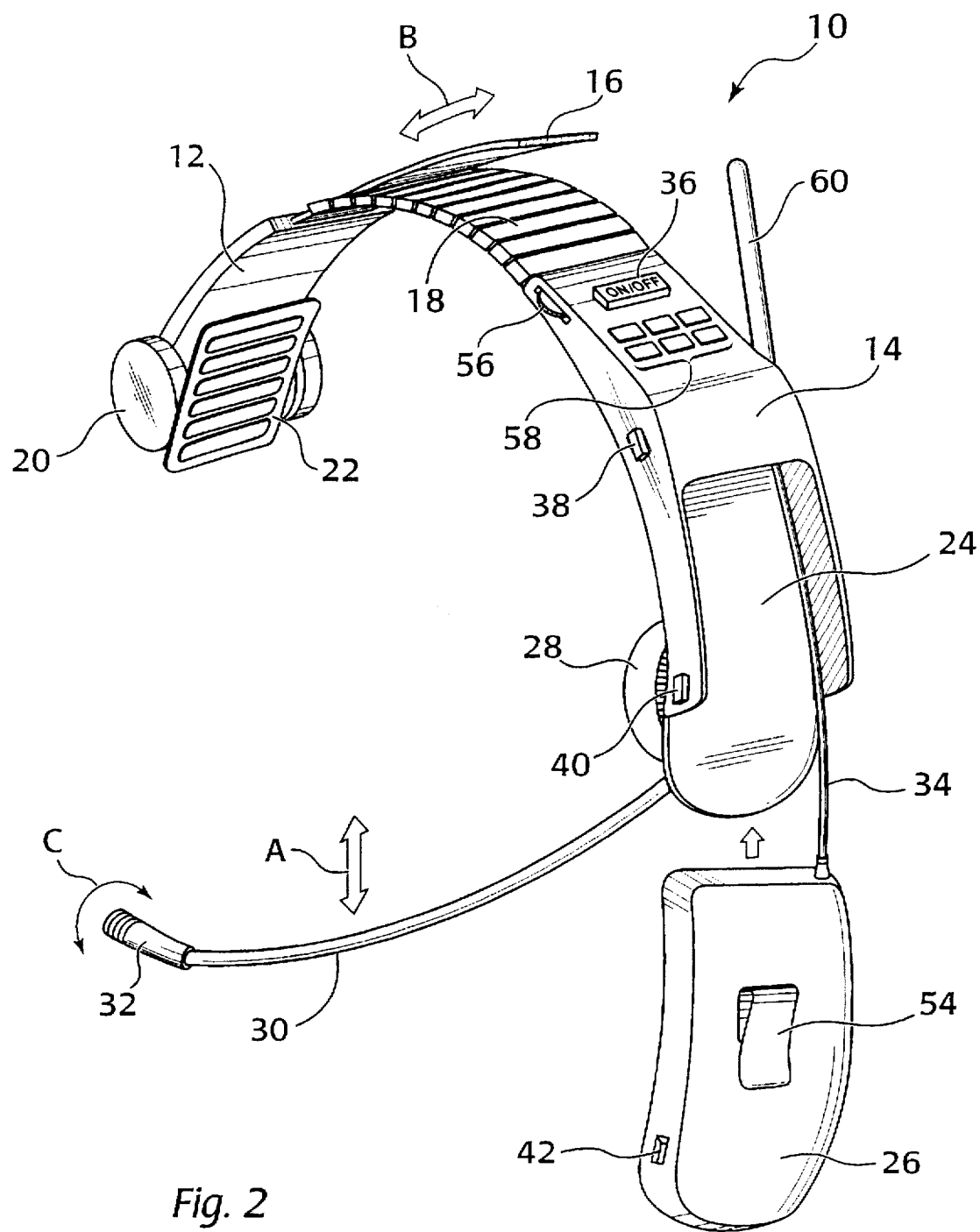
FIG. 2 is a perspective view of a second embodiment of the cordless headset telephone according to the invention.

FIG. 2 shows a second embodiment of headset 10 with an external antenna 60 mounted on curved portion 14 for sending and receiving signals. A rotatable dial switch 56 is disposed on the side of curved portion 14 and enables the switching on and off of the ringer in addition to controlling the volume of the ringer. A plurality of control buttons 58 have been added to curved portion 14 for providing a plurality of telephone functions at the headset itself. For example, buttons 58 can be memory buttons for dialing regularly called numbers or can be buttons for hold, mute, intercom, channel changing, etc. Keypad 26 includes a clip 54 mounted on the outside surface thereof for allowing the placement of said keypad on the belt or other convenient remote location on the users body.

Figure 3:
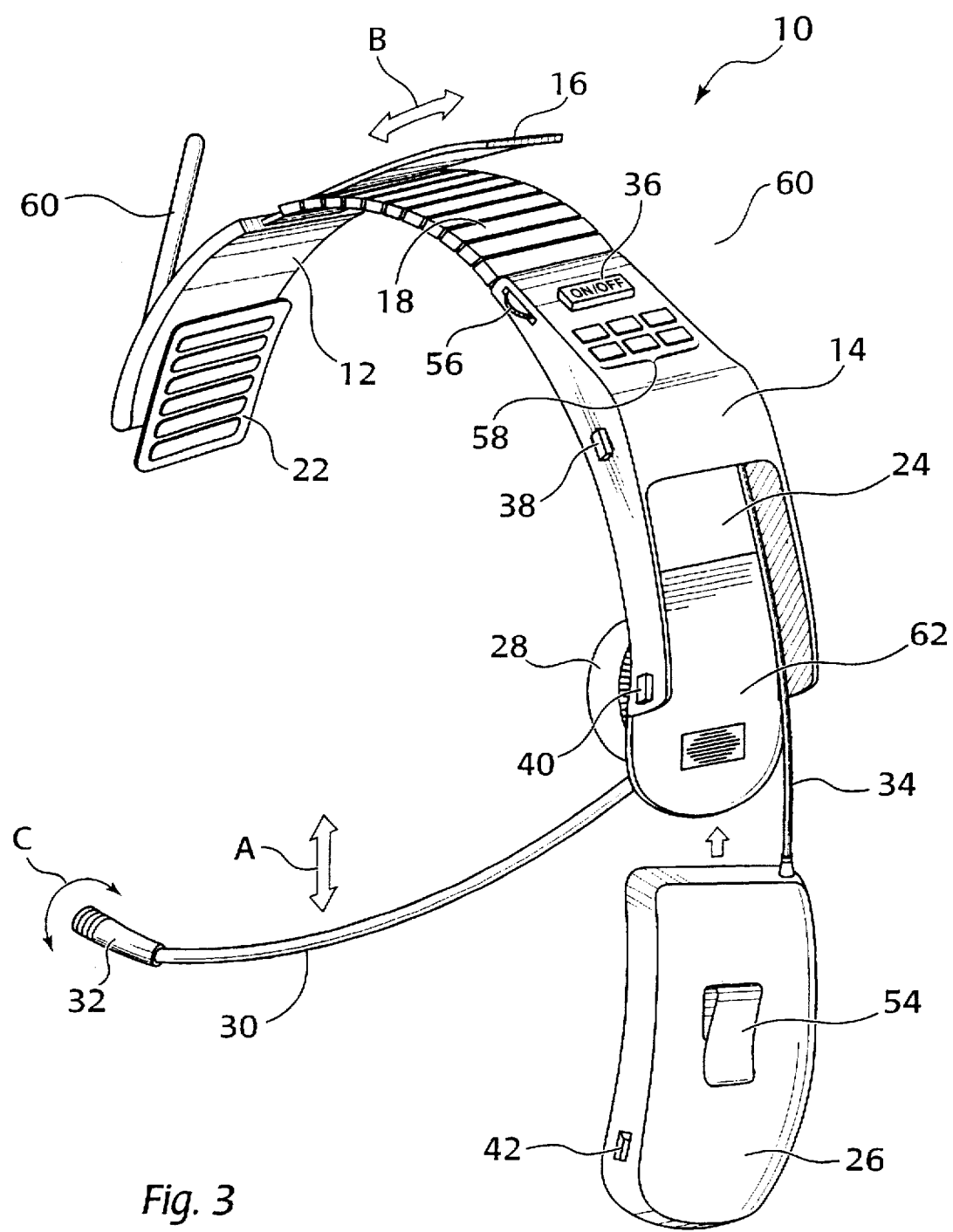
FIG. 3 is perspective view of a third embodiment of the cordless headset telephone according to the invention.

FIG. 3 shows a third embodiment of the headset 10 incorporating the features of the previous embodiments, except that the battery compartment 62, for receiving a rechargeable battery, is disposed on curved portion 14 and underneath keypad 26 when said keypad is disposed in the fully retracted position. In this embodiment, external antenna 60 is positioned on curved portion 12.

Figure 4:
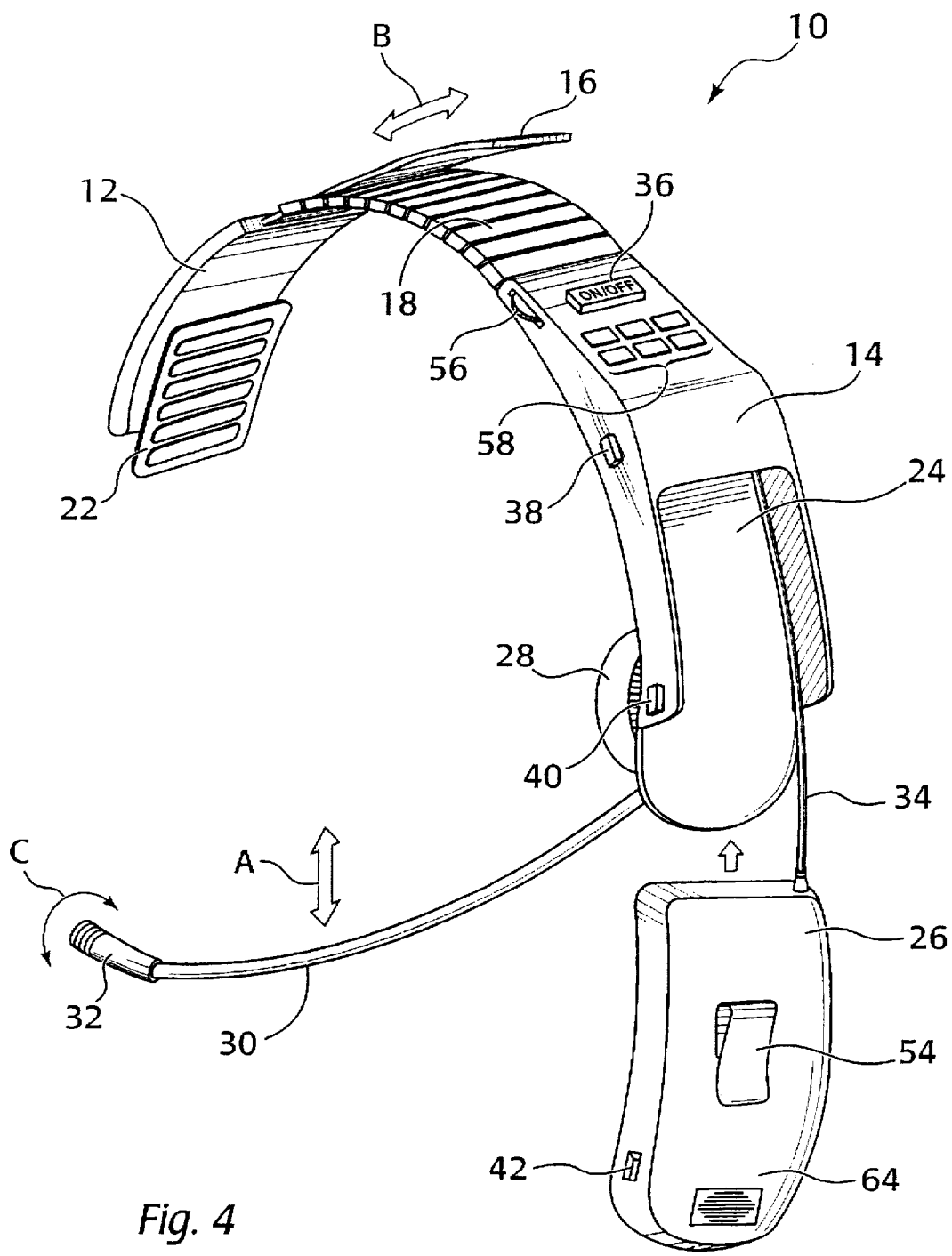
FIG. 4 is a perspective view of a fourth embodiment of the cordless headset telephone according to the invention.

FIG. 4 shows a fourth embodiment of the invention where battery compartment 64, for receiving a rechargeable battery, is disposed within keypad 26. Furthermore, headset 10 has an internal antenna that is incorporated into adjustment band 16 which eliminates the need for an additional external antenna.

Figure 5:
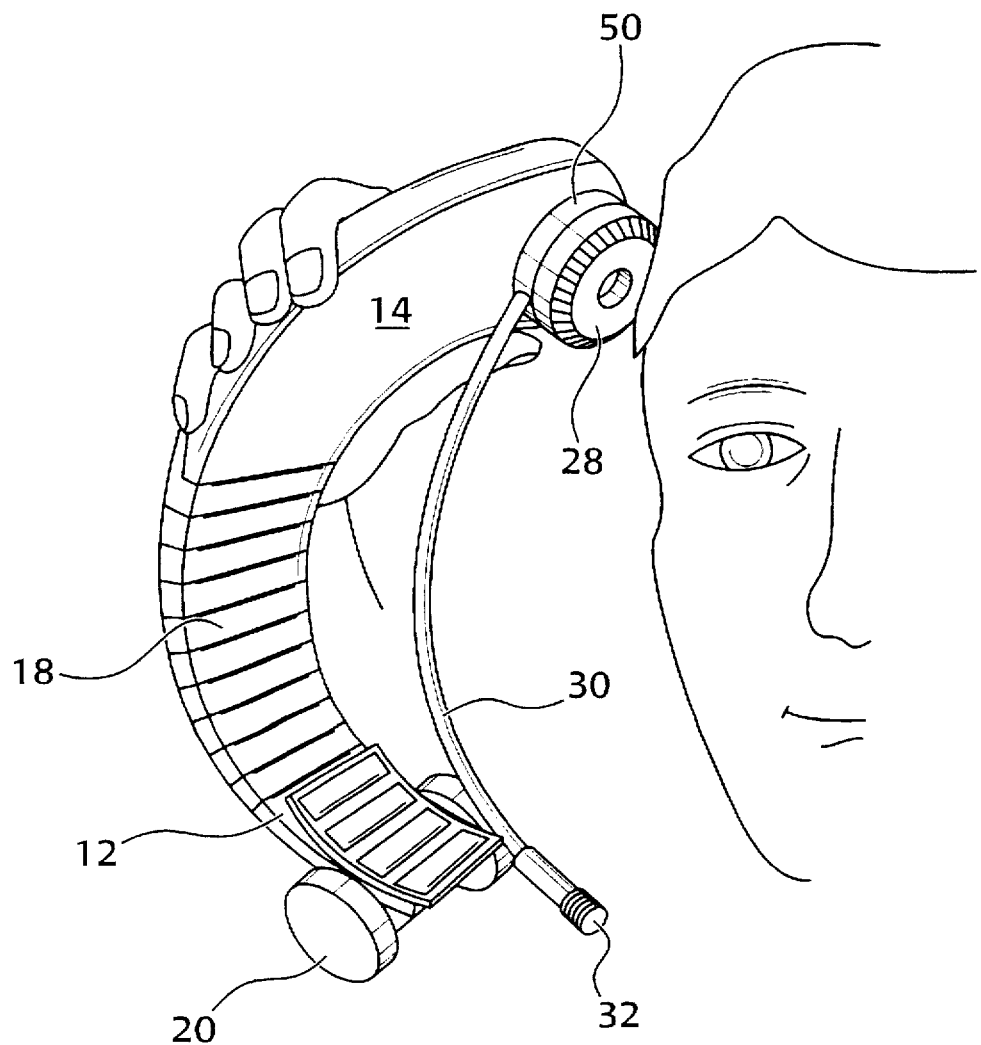
FIG. 5 is a perspective view of the cordless headset telephone in its second operable position.

FIG. 5 shows headset 10 in its second operable position. Microphone arm 30 is connected to a rotating disk 50 mounted at the base of earpiece 28. Rotating disk 50 rotates independently from earpiece 28 which does not rotate. Microphone arm 30 has been rotated approximately 100° from its first operable position to extend down along the inside surface of headset 10. Curved portions 14 and 12 and flexible portion 18 are in their most closed position allowing the user to hold the headset as a handset. In this configuration, microphone 32 is now disposed adjacent battery compartments 20 and comfort pad 22, and thereby allows the user to place earpiece 28 on the ear while situating microphone 32 in front of their mouth for receiving communication.

When headset 10 is in this second operable position, earpiece 28 can be placed on either the left or right ear of the user without interfering with or changing the operation thereof.

Figure 6:
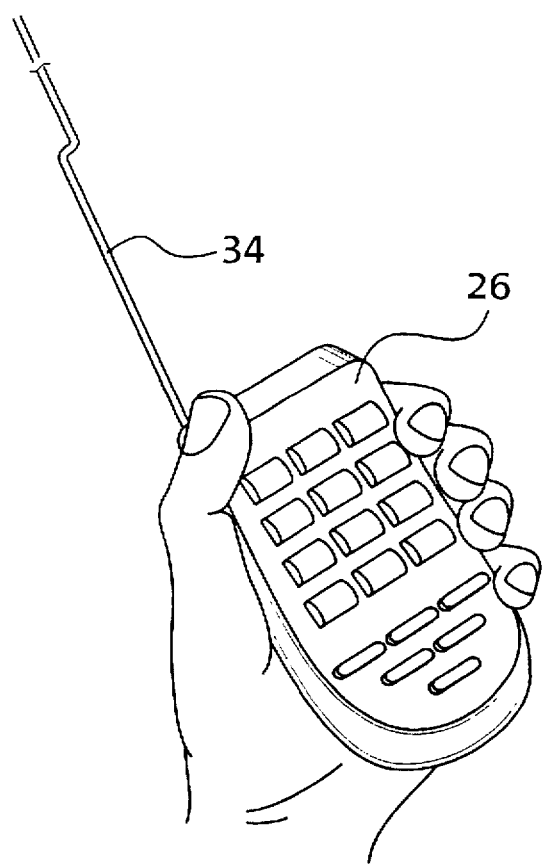
FIG. 6 is the keypad of the cordless headset telephone according to the invention.

FIG. 6 shows keypad 26 with the wire 34. Keypad 26 provides all of the basic telephone operations and may include other functions such as redial, pause, flash, mute, hold, and channel changing. Keypad 26 with retractable wire 34 can be removed from headset 10 and positioned in a remote location on the user's body, such as, for example, in their shirt pocket or on their belt to enable easy access to the dialing keypad without having to remove or displace headset 10 from the users head. When keypad 26 is removed from headset 10, wire 34 remains attached to the headset such that when the retract button 38 is depressed, wire 34 is drawn back into headset 10, and thus keypad 26 can be repositioned into receiving space 24 in second curved portion 14.

Figure 7:
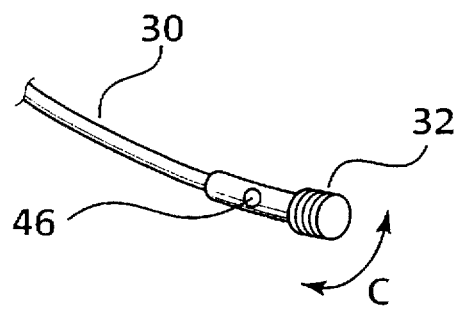
FIG. 7 is the microphone of the cordless headset according to the invention.

FIG. 7 shows rotatable microphone 32 having a tri-color LED 46. Microphone 32 has three separate positions for providing three separate functions of the microphone. Microphone 32 can control such functions as, mute, hold, on hook, off hook, etc. Tri-color LED 46 has specific colors designated to indicate the present position of rotating microphone 32 and can have a flashing mode for indicating that the phone is ringing. In another embodiment, microphone 32 can have multiple separate positions for providing multiple separate functions of the microphone. In addition, LED 46 would be multi-colored such that for each of the separate multiple positions, LED 46 would have a separate color for each position of microphone 32. Multi-colored or Tri-colored LED's are well known electrical devices that can be illuminated in different colors depending on the value of voltage and/or current applied to the LED. In this configuration, the separate mechanical positions of microphone 32 will apply varying voltage and/or current signals to LED 46, and thereby enable multi-colored display based on the mechanical operating position of microphone 32.

All embodiments of cordless headset telephone 10 include an on/off switch 36 which enables the user to manually answer the phone from the headset without having to go to the base or an external extension to answer the phone. Headset 10 and its respective parts can be manufactured from plastics or any other suitable known material.

While several embodiments of the present invention has been shown and described, it is to be understood that many changes and modifications may be made thereunto without departing from the spirit and scope of the invention as defined in the appended claims.

What is claimed is:

1. A cordless headset telephone having transmitter means and receiver means for providing cordless transmission between the headset and a base unit, the cordless headset telephone comprising:

an adjustable headband having a first and a second curved portion, said first curved portion adjustably connected with said second curved portion to define said adjustable headband, each of said first and second curved portions having an opposite free end with an inside surface and an outside surface;

an earpiece having a base connected to said inside surface of said free end of said second curved portion;

a microphone arm having one end rotatably connected around said base of said earpiece and an opposite free end, said microphone arm having a first, a second and a third operable position;

a microphone rotatably connected to said free end of said microphone arm, said microphone having three mechanical positions for controlling three separate functions of the cordless headset;

a keypad releasably connected to said outside surface of said second curved portion of the headset, said keypad remaining connected to the headset with a retractable wire; and a battery compartment disposed at one of said free ends of said curved portions of said headband for receiving a rechargeable battery.

2. The cordless headset telephone according to claim 1, further comprising:

ringing means disposed in said second curved portion of the headset and away from said earpiece;

retraction means disposed within said second curved portion of the headset and connected to said wire of said keypad, said retraction means for selectively releasing and retracting said keypad from the headset;

antenna means internally disposed within the headset for transmitting and receiving signals to and from the base unit;

a pivotable support pad disposed on said inside surface of said first curved portion for providing additional support of the cordless headset on the users head; and on hook switching means disposed on said second curved portion for enabling the user to pick up and disconnect the phone from the headset.

3. The cordless headset according to claim 2, wherein said microphone further comprises a tri-color LED disposed therein for indicating the present position of said microphone.

4. The cordless headset telephone according to claim 2, wherein said retraction means further comprises a retract button on said second curved portion of the headset for selectively retracting said keypad via said wire into said second curved portion of the headset.

5. The cordless headset telephone according to claim 2, wherein said second curved portion of said headset includes a flexible upper portion for enabling a resilient extension of the headset for fitting onto the users head, said flexible upper portion comprising a plurality of rectangular members connected together in next adjacent relation with each other.

6. The cordless headset telephone according to claim 2, wherein said microphone arm extends outwardly from said second curved portion to define said first operable position.

7. The cordless headset telephone according to claim 2, wherein said second operable position of said microphone arm is defined when said microphone arm is rotatably positioned to extend from said earpiece along the inside surface of said first and second curved portions and said microphone is thereby disposed adjacent said pivotable support pad, said second operable position of said microphone arm enables the cordless headset to be used as a cordless handset.

8. The cordless headset telephone according to claim 6, wherein said third operable position of said microphone arm is defined by displacing and rotating said microphone arm from said first operable position to an oppositely extending position thereby enabling the use of the headset on the opposite ear of the user.

9. The cordless headset telephone according to claim 4, wherein said keypad includes a lock receptacle for maintaining said keypad in a retracted position within the cordless headset telephone.

10. A cordless headset telephone having transmitter means and receiver means for providing cordless transmission between the headset and a base unit, the cordless headset telephone comprising:

an adjustable headband having a first and a second curved portion, said first curved portion adjustably connected with said second curved portion to define said adjustable headband, each of said first and second curved portions having an opposite free end with an inside surface and an outside surface;

an earpiece having a base connected to said inside surface of said free end of said second curved portion;

a microphone arm having one end rotatably connected around said base of said earpiece and an opposite free end, said microphone arm having a first, a second and a third operable position;

a microphone rotatably connected to said free end of said microphone arm, said microphone having three positions for controlling three separate functions of the cordless headset;

a keypad releasably connected to said outside surface of said second curved portion of the headset, said keypad connected to the headset with a retractable wire and having a clip disposed thereon for maintaining said keypad in a remote location on the users body away from the headset;

a battery compartment disposed at said free end of said first curved portion of said headband for receiving a rechargeable battery;

ringing means disposed in said second curved portion of the headset and away from said earpiece, said ringing means including a dial switch for selectively turning on and off said ringing means and for controlling the volume thereof;

retraction means disposed within said second curved portion of the headset and connected to said wire of said keypad, said retraction means for selectively releasing and retracting said keypad from the headset;

an antenna externally disposed on said second curved portion of the adjustable headband for transmitting and receiving signals to and from the base unit;

a pivotable support pad disposed on said inside surface of said first curved portion for providing additional support of the cordless headset on the users head; and a plurality of control buttons on said second curved portion for controlling telephone functions of the headset.

11. The cordless headset according to claim 10, wherein said microphone further comprises a tri-color LED disposed therein for indicating the present position of said microphone.

12. The cordless headset telephone according to claim 10, wherein said retraction means further comprises a retract button on said second curved portion of the headset for selectively retracting said keypad via said wire into said second curved portion of the headset.

13. The cordless headset telephone according to claim 10, wherein said second curved portion of said headset includes a flexible upper portion for enabling a resilient extension of the headset for fitting onto the users head, said flexible upper portion comprising a plurality of rectangular members connected together in next adjacent relation with each other.

14. The cordless headset telephone according to claim 10, wherein said microphone arm extends outwardly from said second curved portion to define said first operable position.

15. The cordless headset telephone according to claim 10, wherein said second operable position of said microphone arm is defined when said microphone arm is rotatably positioned to extend from said earpiece along the inside surface of said first and second curved portions and said microphone is thereby disposed adjacent said pivotable support pad, said second operable position of said microphone arm enables the cordless headset to be used as a cordless handset.

16. The cordless headset telephone according to claim 14, wherein said third operable position of said microphone arm is defined by displacing and rotating said microphone arm from said first operable position to an oppositely extending position thereby enabling the use of the headset on the opposite ear of the user.

17. The cordless headset telephone according to claim 12, wherein said keypad includes a lock receptacle for maintaining said keypad in a retracted position within the cordless headset telephone.

18. A cordless headset telephone having transmitter means and receiver means for providing cordless transmission between the headset and a base unit, the cordless headset telephone comprising:

an adjustable headband having a first and a second curved portion, said first curved portion adjustably connected with said second curved portion to define said adjustable headband, each of said first and second curved portions having an opposite free end with an inside surface and an outside surface;

an earpiece having a base connected to said inside surface of said free end of said second curved portion;

a microphone arm having one end rotatably connected around said base of said earpiece and an opposite free end, said microphone arm having a first, a second and a third operable position;

a microphone rotatably connected to said free end of said microphone arm, said microphone having three positions for controlling three separate functions of the cordless headset;

a keypad releasably connected to said outside surface of said second curved portion of the headset, said keypad connected to the headset with a retractable wire and having a clip disposed thereon for maintaining said keypad in a remote location on the users body away from the headset;

a battery compartment disposed within said free end of said second curved portion of said headband and under said keypad for receiving a rechargeable battery;

ringing means disposed in said second curved portion of the headset and away from said earpiece, said ringing means including a dial switch connected thereto for selectively turning on and off said ringing means and for controlling the volume thereof;

retraction means disposed within said second curved portion of the headset and connected to said wire of said keypad, said retraction means for selectively releasing and retracting said keypad from the headset;

an antenna externally disposed on said first curved portion of the adjustable headband for transmitting and receiving signals to and from the base unit;

a pivotable support pad disposed on said inside surface of said first curved portion for providing additional support of the cordless headset on the users head; and a plurality of control buttons on said second curved portion of the headband for controlling telephone functions of the headset.

19. The cordless headset according to claim 18, wherein said microphone further comprises a tri-color LED disposed therein for indicating the present position of said microphone.

20. The cordless headset telephone according to claim 18, wherein said retraction means further comprises a retract button on said second curved portion of the headset for selectively retracting said keypad via said wire into said second curved portion of the headset.

21. The cordless headset telephone according to claim 18, wherein said second curved portion of said headset includes a flexible upper portion for enabling a resilient extension of the headset for fitting onto the users head, said flexible upper portion comprising a plurality of rectangular members connected together in next adjacent relation with each other.

22. The cordless headset telephone according to claim 18, wherein said microphone arm extends outwardly from said second curved portion to define said first operable position.

23. The cordless headset telephone according to claim 18, wherein said second operable position of said microphone arm is defined when said microphone arm is rotatably positioned to extend from said earpiece along the inside surface of said first and second curved portions and said microphone is thereby disposed adjacent said pivotable support pad, said second operable position of said microphone arm enables the cordless headset to be used as a cordless handset.

24. The cordless headset telephone according to claim 22, wherein said third operable position of said microphone arm is defined by displacing and rotating said microphone arm from said first operable position to an oppositely extending position thereby enabling the use of the headset on the opposite ear of the user.

25. The cordless headset telephone according to claim 20, wherein said keypad includes a lock receptacle for maintaining said keypad in a retracted position within the cordless headset telephone.

26. A cordless headset telephone having transmitter means and receiver means for providing cordless transmission between the headset and a base unit, the cordless headset telephone comprising:

an adjustable headband having a first and a second curved portion, said first curved portion adjustably connected with said second curved portion to define said adjustable headband, each of said first and second curved portions having an opposite free end with an inside surface and an outside surface;

an earpiece having a base connected to said inside surface of said free end of said second curved portion;

a microphone arm having one end rotatably connected around said base of said earpiece and an opposite free end, said microphone arm having a first, a second and a third operable position;

a microphone rotatably connected to said free end of said microphone arm, said microphone having three positions for controlling three separate functions of the cordless headset;

a keypad releasably connected to said outside surface of said second curved portion of the headset, said keypad connected to the headset with a retractable wire and having a clip disposed thereon for maintaining said keypad in a remote location on the users body away from the headset;

a battery compartment disposed within said keypad for receiving a rechargeable battery;

ringing means disposed in said second curved portion of the headset and away from said earpiece, said ringing means including a dial switch connected thereto for selectively turning on and off said ringing means and for controlling the volume thereof;

retraction means disposed within said second curved portion of the headset and connected to said wire of said keypad, said retraction means for selectively releasing and retracting said keypad from the headset;

an antenna internally disposed within the adjustable connection of said first and second curved portions for transmitting and receiving signals to and from the base unit;

a pivotable support pad disposed on said inside surface of said first curved portion for providing additional support of the cordless headset on the users head; and a plurality of control buttons on said second curved portion for controlling telephone functions of the headset.

27. The cordless headset according to claim 26, wherein said microphone further comprises a tri-color LED disposed therein for indicating the present position of said microphone.

28. The cordless headset telephone according to claim 26, wherein said retraction means further comprises a retract button on said second curved portion of the headset for selectively retracting said keypad via said wire into said second curved portion of the headset.

29. The cordless headset telephone according to claim 26, wherein said second curved portion of said headset includes a flexible upper portion for enabling a resilient extension of the headset for fitting onto the users head, said flexible upper portion comprising a plurality of rectangular members connected together in next adjacent relation with each other.

30. The cordless headset telephone according to claim 26, wherein said microphone arm extends outwardly from said second curved portion to define said first operable position.

31. The cordless headset telephone according to claim 26, wherein said second operable position of said microphone arm is defined when said microphone arm is rotatably positioned to extend from said earpiece along the inside surface of said first and second curved portions and said microphone is thereby disposed adjacent said pivotable support pad, said second operable position of said microphone arm enables the cordless headset to be used as a cordless handset.

32. The cordless headset telephone according to claim 30, wherein said third operable position of said microphone arm is defined by displacing and rotating said microphone arm from said first operable position to an oppositely extending position thereby enabling the use of the headset on the opposite ear of the user.

33. The cordless headset telephone according to claim 28, wherein said keypad includes a lock receptacle for maintaining said keypad in a retracted position within the cordless headset telephone.

34. A cordless headset telephone having transmitter means and receiver means for providing cordless transmission between the headset and a base unit, the cordless headset having a headband with opposite free ends each having an inside surface and an outside surface, the cordless headset telephone comprising:

a keypad releasably connected to the headset, said keypad enabling the user to operate the telephone functions of the headset;

a retractable wire having a first end coupled to said keypad and an opposite second end, said retractable wire for maintaining said keypad attached to the headset after said keypad has been released therefrom; and retraction means disposed within said headset and connected to said second end of said retractable wire, said retraction means for selectively releasing and retracting said keypad from and into the headset.

35. The cordless telephone headset according to claim 34, further comprising:

a clip disposed on said keypad for releasably securing said keypad on a remote location on the users body away from the headset.

36. The cordless headset telephone according to claim 34, wherein said retraction means further comprises a retract button on the second curved portion of the headset for selectively retracting said keypad via said wire into said second curved portion of the headset.

37. The cordless headset telephone according to claim 34, wherein said keypad includes a lock receptacle for maintaining said keypad in a retracted position within the cordless headset telephone.

* * * * *